Oct. 9, 1962 — H. R. BILLETER — 3,057,553
ACTUATING COUNTER
Filed April 4, 1957 — 8 Sheets-Sheet 1

Inventor
Henry Robert Billeter
by Fidler, Crouse & Beardsley
Attorneys

Oct. 9, 1962 H. R. BILLETER 3,057,553
ACTUATING COUNTER
Filed April 4, 1957 8 Sheets-Sheet 2

Inventor
Henry Robert Billeter
Fidler, Crouse & Beardsley
Attorneys

Oct. 9, 1962     H. R. BILLETER     3,057,553
ACTUATING COUNTER
Filed April 4, 1957     8 Sheets-Sheet 3
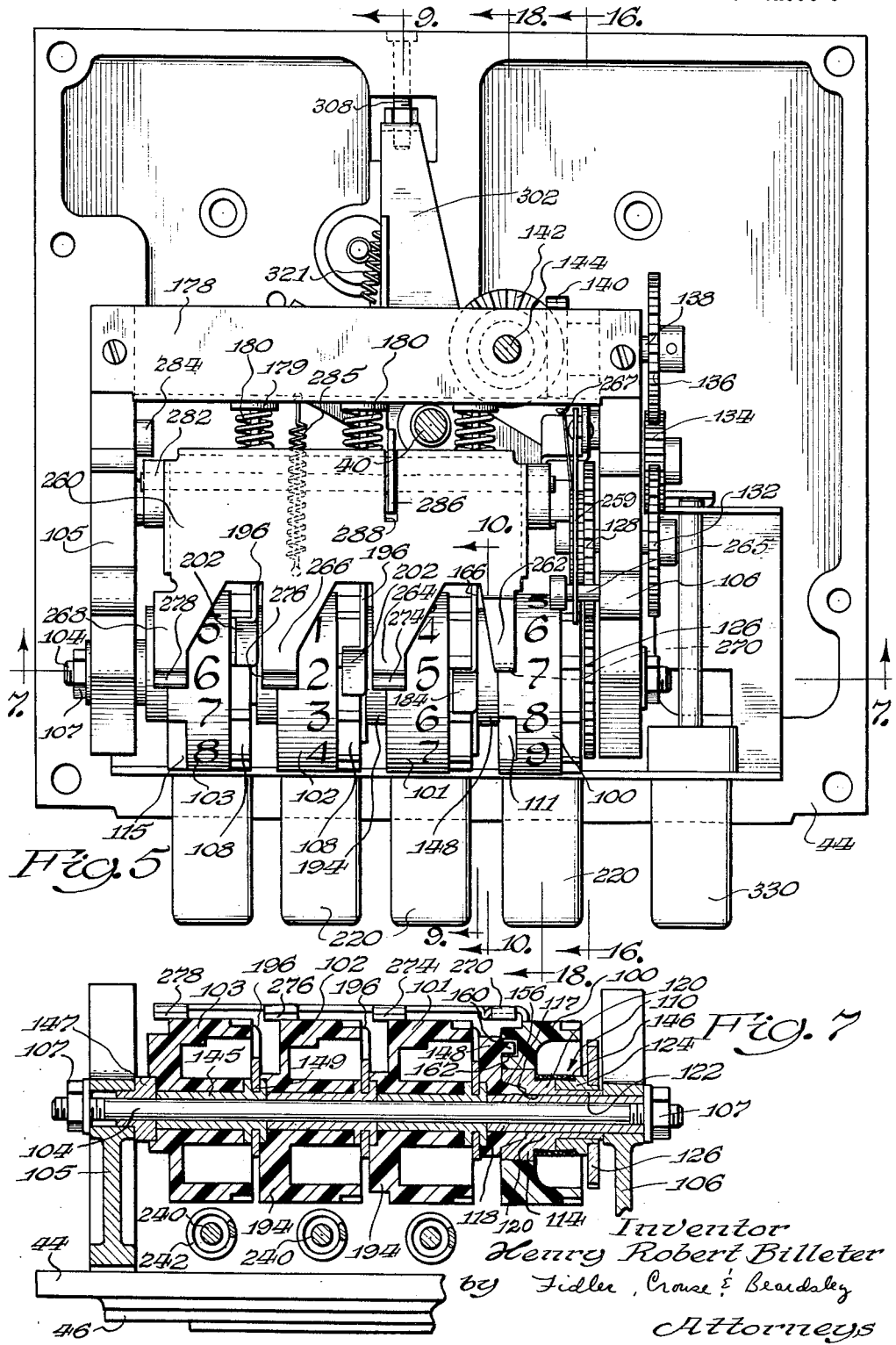
Inventor
Henry Robert Billeter
by Fidler, Crouse & Beardsley
Attorneys Oct. 9, 1962     H. R. BILLETER     3,057,553
ACTUATING COUNTER
Filed April 4, 1957     8 Sheets-Sheet 4
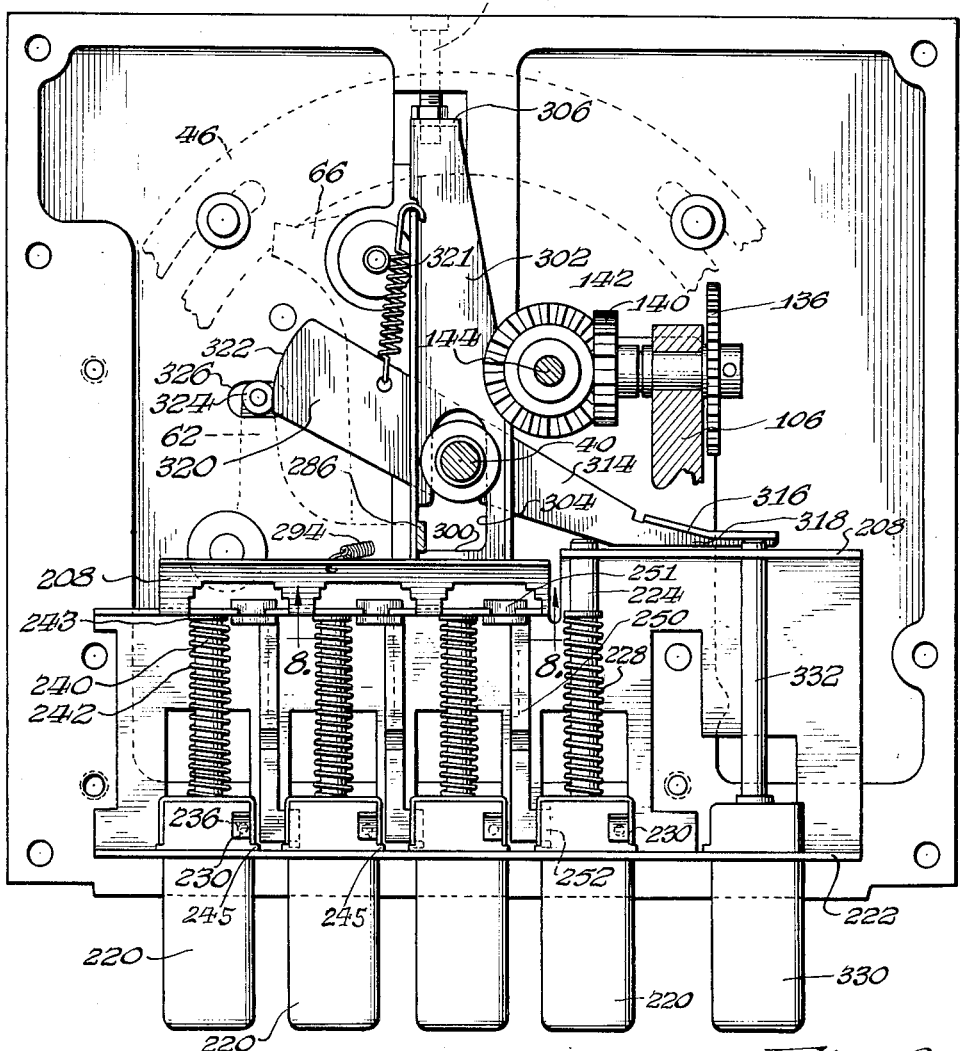
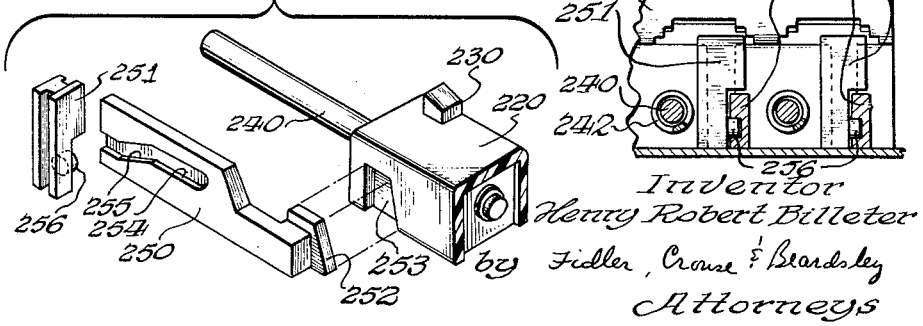

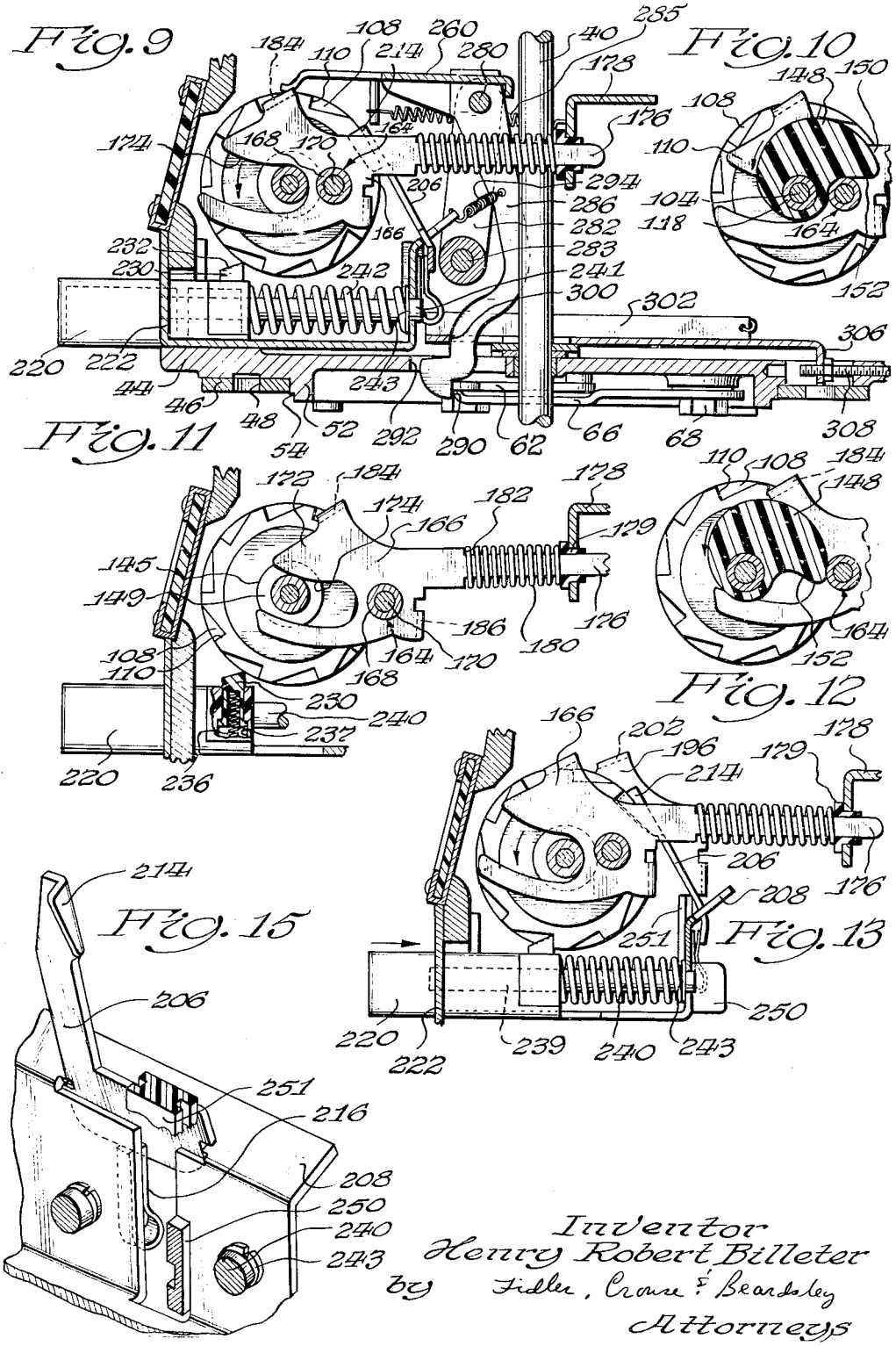

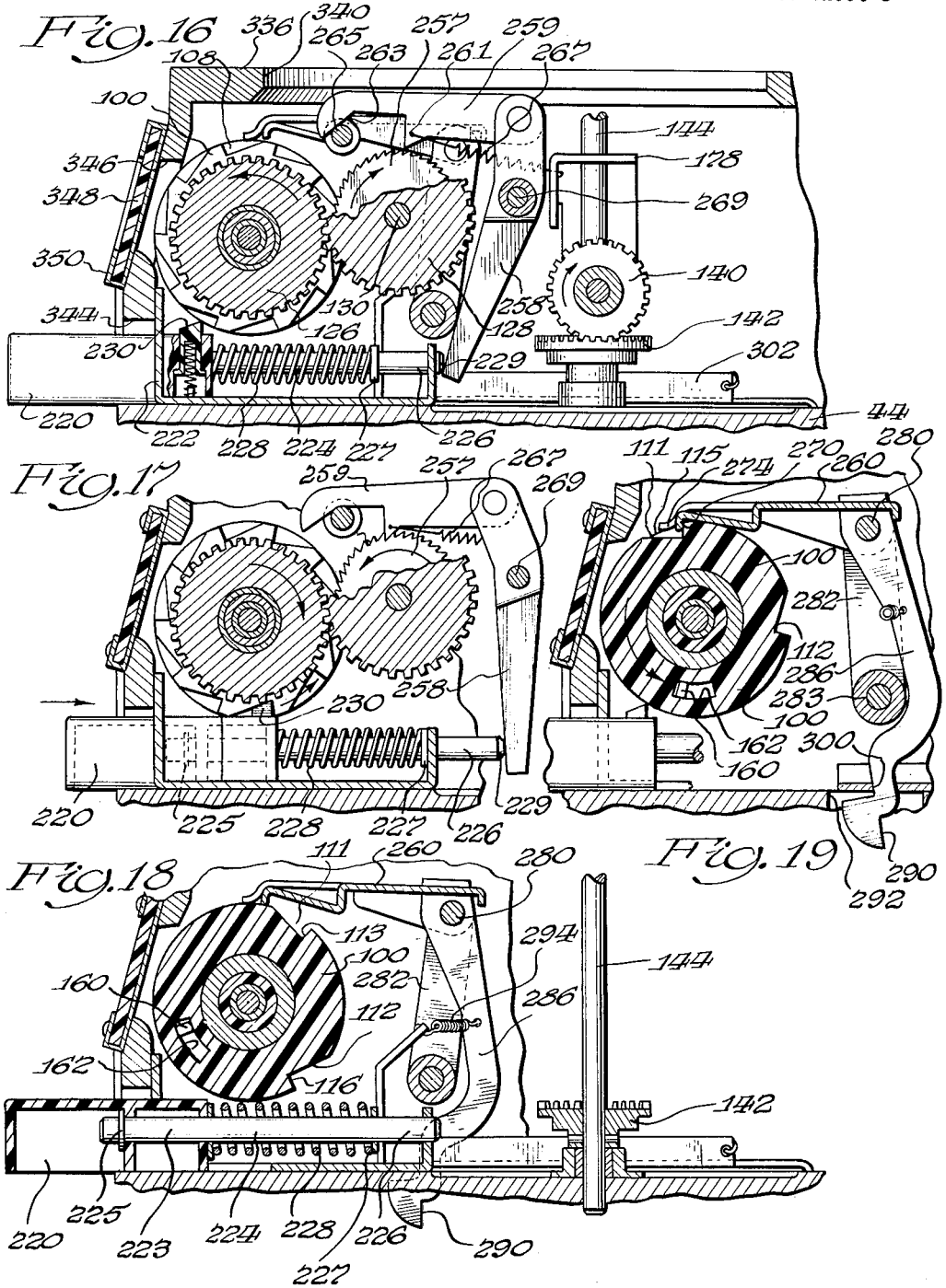

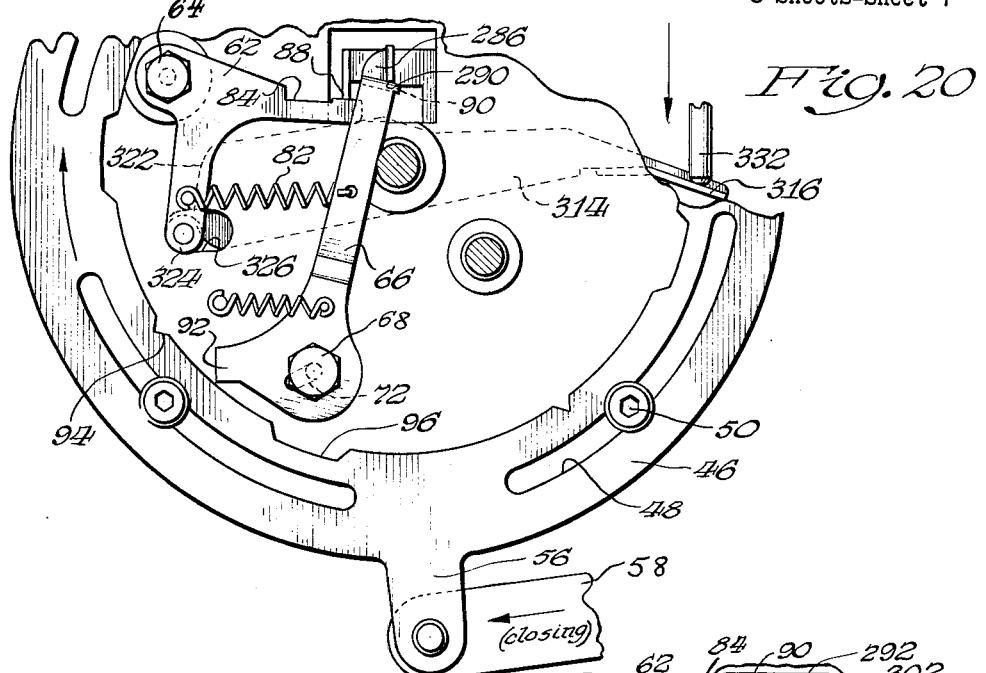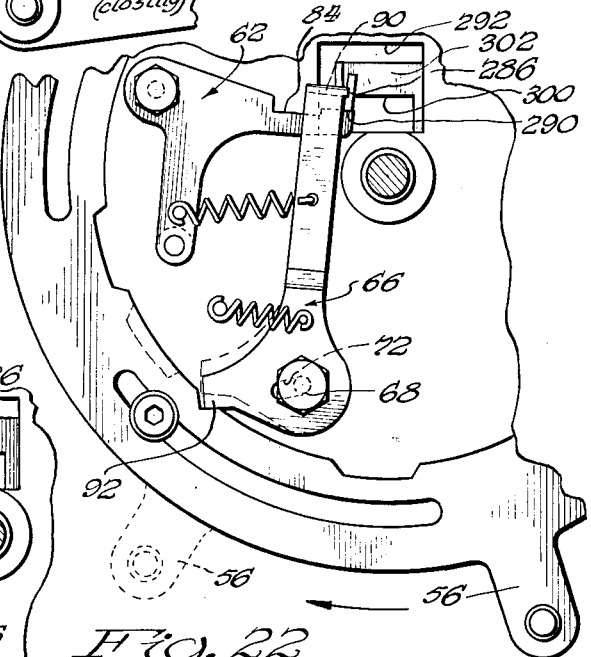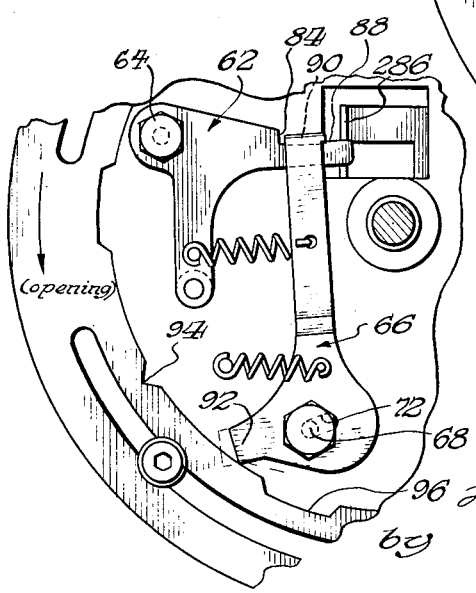

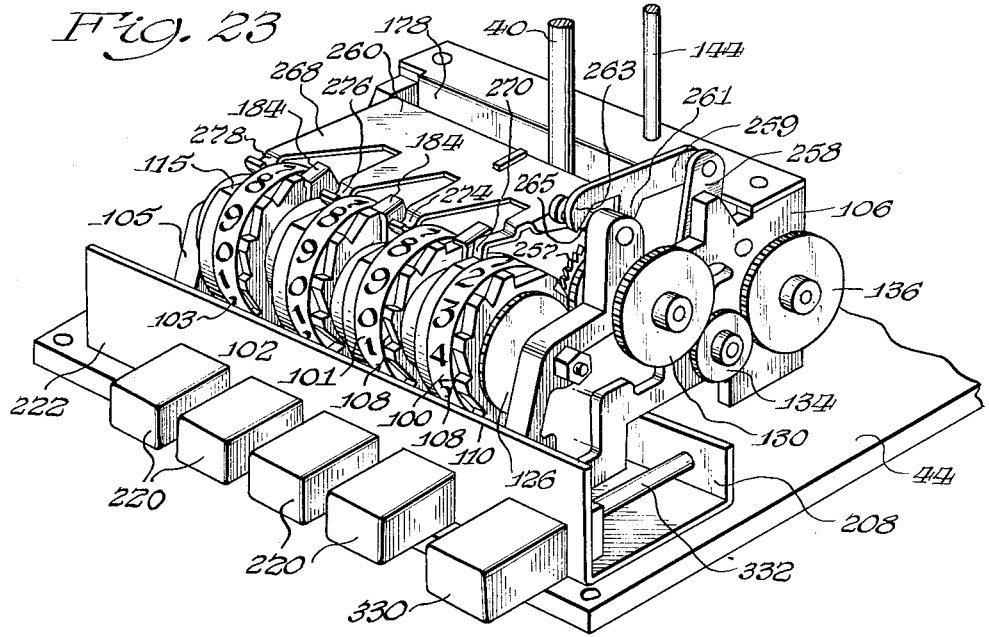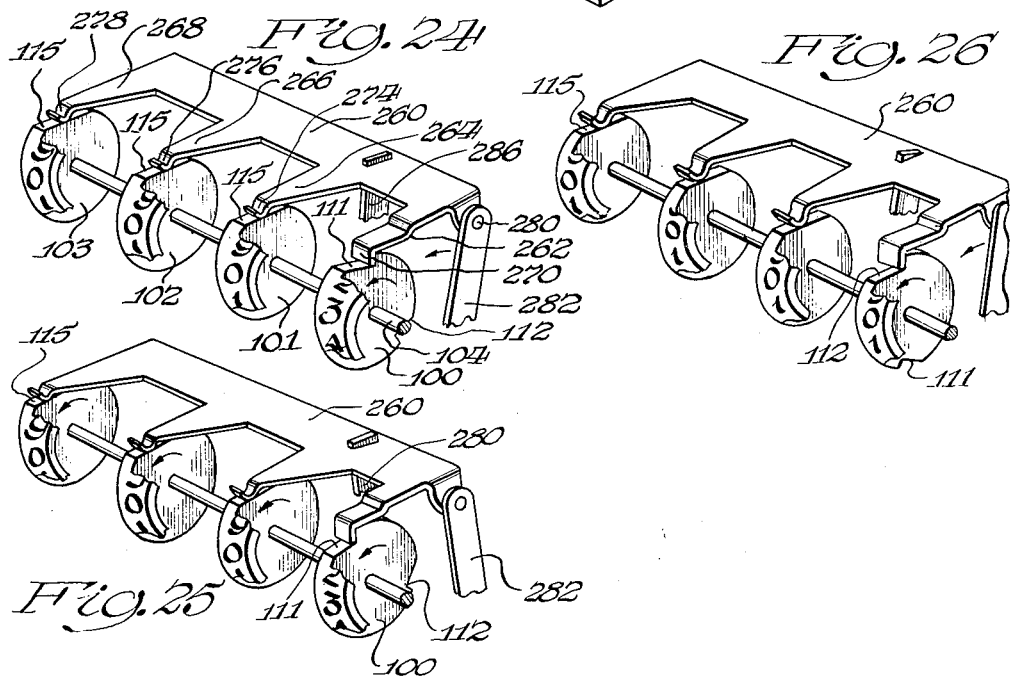

United States Patent Office 3,057,553
Patented Oct. 9, 1962

3,057,553
ACTUATING COUNTER
Henry Robert Billeter, Deerfield, Ill., assignor to Liquid Controls Corporation, Chicago, Ill., a corporation of Illinois
Filed Apr. 4, 1957, Ser. No. 650,640
8 Claims. (Cl. 235—132)

This invention relates to an actuating counter, and more particularly to a counter adapted to be preset to actuate a controlled element after a desired number of movements of an element of a controlling mechanism.

Counting devices have been employed heretofore for initiating or halting operation of an operating system. For example, they have been used to halt a moving mechanism after a predetermined number of movements thereof. These prior devices commonly included mutilated pinion mechanisms or epicyclic gear trains to drive the various number wheels, or register wheels, utilized by the counter mechanism. Accordingly, such prior counting devices were intricate, tended to cause or permit movement of higher order number wheels of the counter on rotation of the wheel of the next lower order, were subject to cumulative backlash, and were attended by a varying torque requirement for movement of the number wheels, which torque requirement reached relatively high, intermittent peaks.

An object of the present invention is to provide a novel counter which can be preset to a desired number of units to be counted, to count those units, and to effect a subsequent control movement of a controlled element.

Another object is to provide a counter having a plurality of number wheels rotated progressively with a minimum torque requirement.

Yet another object is to provide a counter having a plurality of number wheels rotated progressively, which counter is so constructed as to have a substantially constant torque requirement regardless of the number of wheels being rotated.

A further object is to provide a counter having a plurality of number wheels rotated progressively, wherein energy is accumulated during substantially all of a cycle of operation of one number wheel for driving a successive wheel through a portion of the cycle of the latter.

A still further object is to provide a counter having a plurality of number wheels rotated progressively, wherein the torque requirement for driving the wheels is so uniformized as to require only a relatively light drive mechanism.

Yet a further object is to provide a counter coupled to a source of driving power and having a plurality of number wheels adapted to be rotated progressively, wherein only a relatively uniform and moderate torque is required to drive the number wheels, thereby promoting the accuracy and life of the source of driving power.

Still another object is to provide a counter having a plurality of number wheels adapted to rotate intermittently without material backlash.

A further object is to provide a counter having a register of number wheels, each rotatable through a series of number-indicating positions, which counter is constructed so that each wheel will be accurately located and held in any of the number-indicating positions.

Another object is to provide a counter having a plurality of number wheels, each having driving connection with a next successive number wheel during only a predetermined portion of rotation of the number wheel.

Yet another object is to provide a shut-off counter adapted to be driven directly off the driving shaft of a visible register counter without the requirement of differential gearing adjusting the units to be counted by the counter to the rotative speed of the visible register counter shaft.

Yet another object is to provide a counter having a plurality of rotatable number wheels and clutch means in a drive train therefor adapted to apply torque to the wheels without backlash, and further adapted to permit any of the wheels to be preset without change in the position of the remaining elements of the drive train.

Another object is to provide a counter having a plurality of rotatable number wheels and an anti-backlash element in a drive train therefor which element does not materially add to the torque requirement on the drive train.

Another object is to provide a shut-off counter including a reciprocating linkage adapted to effect a movement of a controlled element, which linkage is so adjustable that the counter is adapted to be installed, without modification, in a plurality of positions relative to the controlled element.

Another object is to provide a counter adapted to be operatively connected to any one of a range of sizes of liquid meters constituting a source of driving power for the counter.

Another object is to provide a shut-off counter adapted to be driven off the driving shaft of a visible register counter and so connected operatively thereto that a change in the gear train of the visible register counter automatically adjusts the shut-off counter correspondingly without requirement of a gear change therein.

A further object is to provide a shut-off counter having push-type reset keys, which counter is so constructed that it is protected from being damaged should a reset key be depressed during the operation of the counter.

Yet a further object is to provide a shut-off counter having a push-type reset key for each number wheel, which counter is so constructed that each wheel can be reset independently of the others.

A further object is to provide a counter for connection to a liquid valve, and adapted to hold the valve open during the passage of a predetermined quantity of liquid therethrough.

Another object is to provide a counter for connection to a liquid valve, and adapted to hold the valve open during the passage of a predetermined quantity of liquid through the valve, to permit the valve to partially close for the passage of a second predetermined quantity, and to permit the valve to completely close after the passage of both quantities of liquid.

Still another object is to provide a counter adapted to close a valve after passage of a predetermined quantity of liquid therethrough, which counter acts to effect the closing movement sufficiently prior to the moment when a predetermined quantity of liquid will have flowed to allow for momentum of the counter mechanism and the liquid.

Another object is to provide a counter so constructed that the units of measurement thereof may be altered tenfold by a simple predetermined gearing substitution.

A further object is to provide a shut-off counter adapted to be manually actuated prior to the automatic actuation thereof to effect an emergency shut-off.

Other objects and advantages of the present invention will appear from a detailed description thereof as hereinbelow set forth, taken in connection with the appended drawings, in which:

FIG. 5 is a top plan view of the device shown in FIGS. 3 and 4 with the housing thereof completely removed;

FIG. 6 is a view of the structure as shown in FIG. 5 with certain elements thereof removed to expose details;

FIG. 7 is a fragmentary sectional view taken substantially on line 7—7 of FIG. 5;

FIG. 8 is a fragmentary sectional view taken substantially on line 8—8 of FIG. 6;

FIG. 9 is a fragmentary sectional view taken substantially on line 9—9 of FIG. 5, showing a portion of the transfer mechanism in a first translational position;

FIG. 10 is a fragmentary sectional view taken substantially on line 10—10 of FIG. 5, showing a portion of the transfer mechanism shown in FIG. 9, and including the actuating cam therefor;

FIG. 11 is a fragmentary sectional view of the mechanism shown in FIG. 9 in a second translational position;

FIG. 12 is a fragmentary sectional view of the mechanism shown in FIG. 10 in a second translational position;

FIG. 13 is a fragmentary sectional view of the mechanism shown in FIG. 9 shown during manual actuation;

FIG. 14 is a fragmentary exploded view of a portion of the means for inactivating a wheel ratcheting fork during manual setting of a number wheel;

FIG. 15 is a fragmentary perspective view of portions of the anti-backlash detent means and of the fork inactivating means;

FIG. 16 is a fragmentary sectional view taken substantially on line 16—16 of FIG. 5, but showing the counter mechanism encased in a protective housing;

FIG. 17 shows the mechanism of FIG. 16 in one of the translational positions thereof;

FIG. 18 is a fragmentary sectional view taken substantially on line 18—18 of FIG. 5;

FIG. 19 shows the mechanism of FIG. 18 in one of the translational positions thereof;

FIG. 20 is a fragmentary bottom plan view of the latching mechanism of the present invention;

FIG. 21 shows the mechanism of FIG. 20 in one of the translational positions thereof;

FIG. 22 shows the mechanism of FIG. 20 in a second translational position thereof;

FIG. 23 is a fragmentary perspective view of the present invention with the housing thereof removed; and FIGS. 24 through 26 are fragmentary perspective views of a portion of the tripping mechanism, illustrating the operation thereof.

The present invention is particularly well adapted to be connected in a liquids handling system, and is herein described with particular emphasis on such a use. However, it is to be understood that the device is not limited to use solely in a liquids handling system but that it may find other useful applications, such as in connection with a system employing a moving element for which it is desired to maintain precision counting and control.

Figure 1:
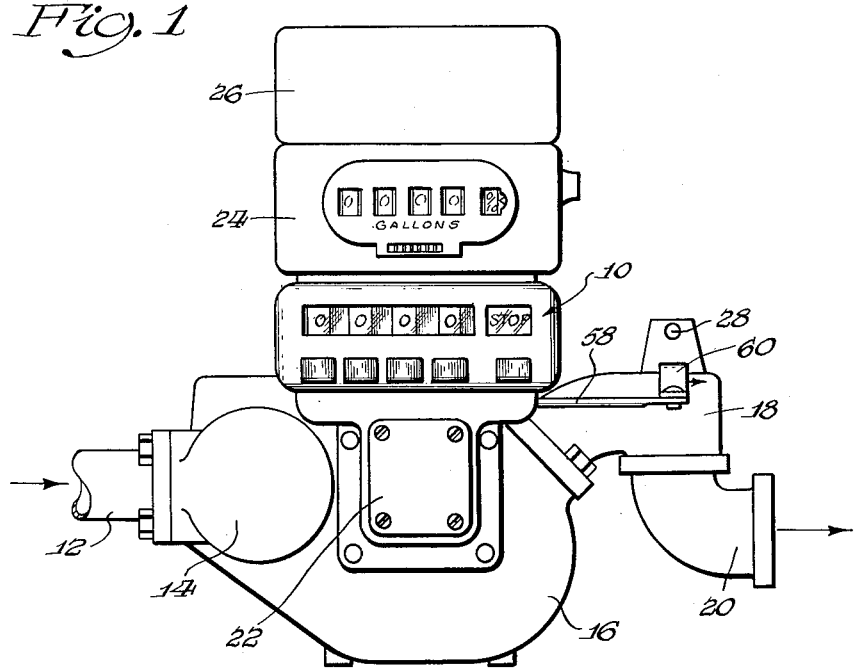
FIG. 1 is a front elevational view of a portion of a liquids handling system including an actuating counter embodying the principles of the present invention.
Figure 2:
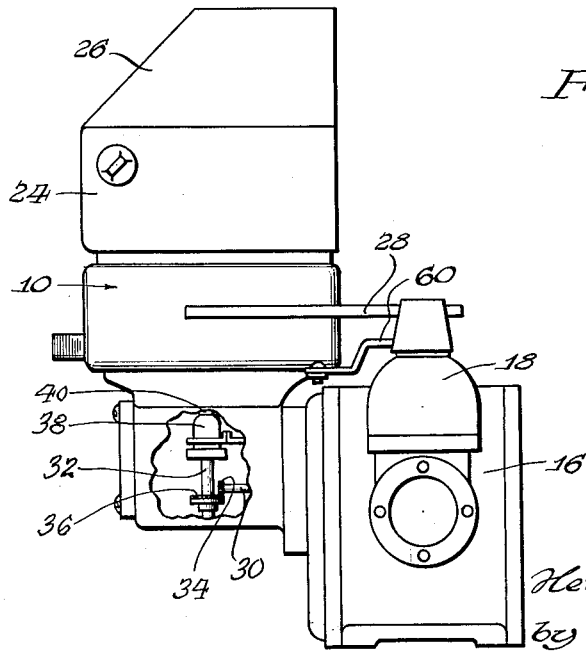
FIG. 2 is a side elevational view of the system shown in FIG. 1 broken away in part.

Referring now to the drawings and in particular to FIGURES 1 and 2 thereof, an actuating counter 10, which may also be referred to as a preset counter, is shown connected in a liquids handling system including an inlet pipe 12, a strainer 14, a liquid displacement meter 16 having a rotating main shaft (not shown), the revolutions of which are directly proportional to the flow of liquid through the meter, a valve 18 and an outlet connection 20, all interconnected in suitable fashion. The assembly of those elements in a liquids handling system is disclosed more in detail and claimed in application Serial No. 553,506 filed December 16, 1955, now abandoned, by George B. Richards, entitled Liquid Transmission Systems, owned by the assignee of the present invention, to which application reference may be made for details of the construction thereof. A gear box 22 is rigidly connected to a face of the liquid displacement meter 16, and is adapted to support thereon a series of stacked liquids handling control elements, such as the preset counter 10, a visible register counter 24, hereinafter referred to as a register, and temperature compensator 26.

The liquids handling system hereinabove outlined is one having particular application to the controlled dispensing of liquids such as petroleum and petroleum products. Preferably the valve 18 is of the normally-closed type incorporating means (not shown) constantly urging the valve toward a closed position and a handle 28 by means of which the valve may be manually moved into an open position. In the embodiment illustrated herein, the force urging the valve 18 into closed position acts in counterclockwise direction as viewed from a position above the valve.

The gear box 22 is adapted to house a shaft 30 supported within sealed bearings (not shown) and projecting into the casing of the liquid displacement meter 16. The shaft 30 is drivingly connected to the meter main shaft (not shown) by suitable means such as a tongue and groove connection (not shown), and is also drivingly connected to a gear box shaft 32 through a pinion 34 and a face gear 36 attached to the shaft 30 and to the gear box shaft 32 respectively.

The gear box shaft 32 is supported vertically within the gear box and is adapted to be drivingly connected to a variable speed adjuster 38 by means of which the drive ratio between the meter main shaft and the register 24 driven thereby can be adjusted to compensate for any substantially constant inaccuracies in various parts of the apparatus. The adjuster is drivingly connected to a register drive shaft 40 rotatively supported by the actuating counter 10, as hereinafter described. The register drive shaft 40, in turn, is drivingly connected to the mechanism in the register 24 to complete the driving association of the liquid displacement meter 16 and the register. It is to be noted that the register drive shaft is not directly connected operatively to mechanism of the actuating counter 10, but that the register drive shaft is an element of the drive train for the register 24 which in turn, as hereinafter described, has driving connection with the counter.

The actuating counter 10 includes a base 44 (FIG. 3), which preferably takes the form of a flat rectangular member provided with a central bore in which a bearing 45 is mounted for supporting the register drive shaft 40. The base 44 is adapted to support on the lower surface thereof mechanism for latching the valve 18 in open position, and is adapted to support on the top surface thereof mechanism for counting the number of units of liquid passing through the meter 16, mechanism for tripping the latching mechanism to release the valve for closing, as well as mechanism by which the counter mechanism may be reset.

Latching Mechanism

Figure 3:
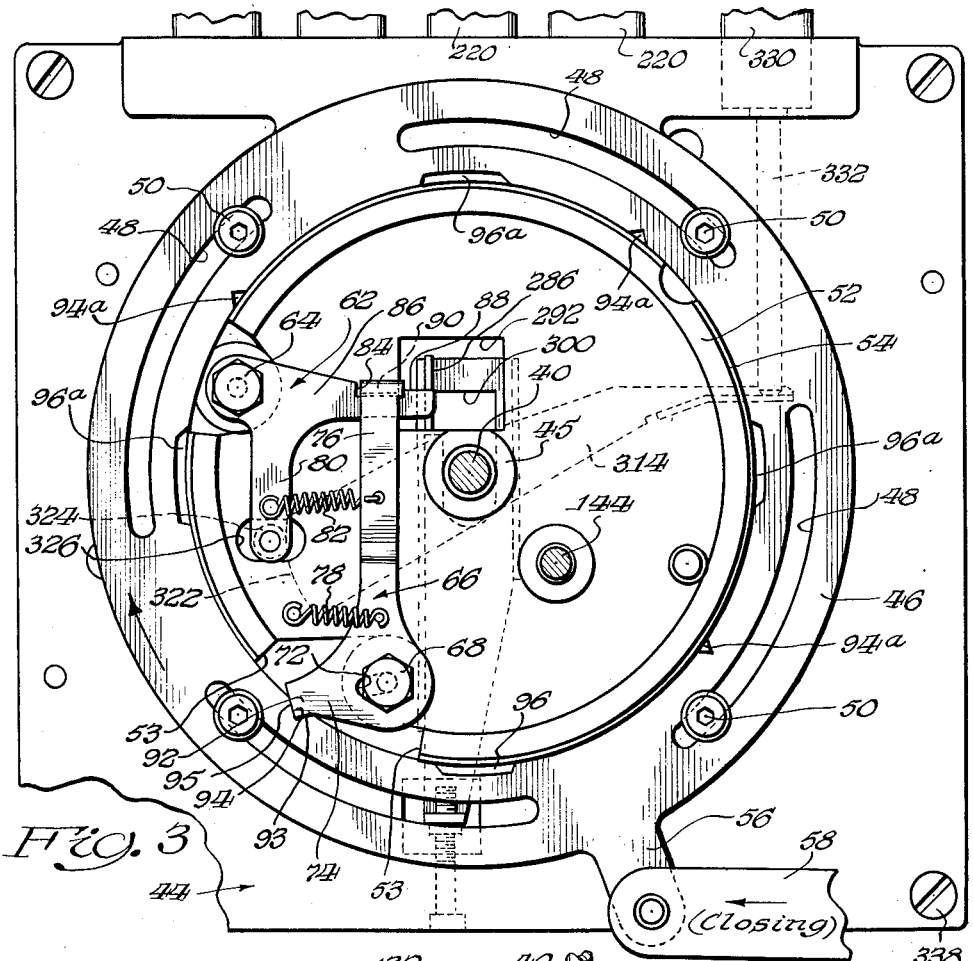
FIG. 3 is a fragmentary bottom plan view of a preferred embodiment of the present invention.

Referring now to FIG. 3 in particular, the latching mechanism supported by the lower surface of the base 44 includes a latching ring 46 taking the form of a flat annulus mounted coaxially with the register drive shaft 40 as to be pivotable therearound. The ring mounting suitably employs spaced arcuate slots 48 formed in the ring and adapted to receive therethrough headed mounting bolts 50 which are threaded into the base 44. A cylindrical flange 52 having an outer diameter slightly smaller than the inner diameter of the ring projects from the lower surface of the base 44 concentric with the register drive shaft 40 and provides a means for guiding the arcuate movement of the ring. A portion of the cylindrical flange is cut away to provide a lateral opening 53 through which engagement may be effected between the ring and other latching elements as hereinafter explained.

The cylindrical flange 52 is further adapted to provide a mounting means for the actuating counter and to this end is rabbetted to form an outer shoulder 54 adapted to engage a complemental flange (not shown) or opening in the upper surface of the gear box 22. The cylindrical flange 52 and the shoulder 54 thereof are of such height as to permit the latching ring 46 to be loosely carried between the bottom surface of the base 44 and the upper surface of the gear box 22 when the present counter is mounted on the latter.

A projection 56 extends radially from the outer edge of the ring 46 and is adapted to have an elongate link member 58 pivotally connected thereto. The link member, in turn, is pivotally connected to the valve 18 as by means of an arm 60 projecting from the valve and adapted to swing arcuately as the valve is moved between open and closed positions. As viewed in FIG. 3, the means urging the valve 18 to a closed position act through the arm 60 and the link 58 to urge the ring 46 in clockwise direction.

Means are provided for latching the ring 46 against movement in valve-closing, clockwise direction when the valve is in open condition, and include an L-shaped latch member 62 pivotally mounted at its central portion on the lower surface of the base 44 by means of a mounting bolt 64 threaded into the base. An L-shaped sear 66 is also pivotally mounted at its central portion on the lower surface of the base 44 by means of a headed mounting bolt 68 threaded into the base 44.

The pivotal connection of the sear 66 to the base 44 is effected through an elongate slot 72 in the sear, through which the shank of the mounting bolt 68 passes. The slot 72 generally parallels a first or locking arm 74 of the sear and provides a mounting by which the sear is pivotable not only about the bolt 68 but also about the end of a second arm 76 of the sear when the latter is fixedly held at one point as hereinafter explained. Spring means resiliently urge the locking arm 74 of the sear through the lateral opening 53 in the flange 52 and toward the ring 46, and suitably take the form of a sear spring 78 fastened to the base 44 at one end and to the second arm 76 of the sear at the second end of the spring. The latch member 62 and the sear 66 are so positioned that a first arm 80 of the latch member is disposed generally parallel to the second arm 76 of the sear, the two arms being urged toward one another about their respective pivots by resilient means such as a helical spring 82 connected at the ends thereof to each.

The latch member and the sear are complementally formed to cooperate with each other, and accordingly, the latch member is provided with a recess 84 in a second arm 86 thereof. The recess is spaced slightly from the end of the arm 86 to provide a tripping shoulder 88 on the latch member for purposes hereinafter explained. The sear is provided with an upstanding flange 90 on the end of the second arm 76 thereof, which flange is adapted to engage the recess 84 in the arm 86 of the latch member 62 to prevent pivotal movement of the sear about the mounting bolt 68.

The locking arm 74 of the sear is provided with a projection 92 adapted to lockingly engage the ring 46. To enable locking engagement with the projection, the ring 46 is provided with a pair of circumferentially spaced recesses in the inner surface thereof and comprising a first recess 94 shaped complementally to the sear projection 92, and constituting a means of holding the valve in fully opened position as hereinafter explained, and a second recess 96 having an arcuate extent and end edges inclined complementally to the edges of the projection. The second recess 96 constitutes a means of holding the valve in partially opened position.

Preferably the projection 92 has edges forming a 90° angle and includes an abutting edge 93 making a relatively small angle with a radial line through the register drive shaft 40 about which the ring 46 rotates. A second or camming edge 95 makes an angle with a radial line through the register drive shaft axis substantially greater than the angle formed by the abutting edge. It will be apparent that the abutting edge 93 thus presents an obstacle to the resilient tendency of the valve 18 to rotate the ring 46 in valve closing direction (clockwise, as viewed in FIG. 3). On the other hand, the camming edge 95 will pivot the sear 66 about the sear flange 90 when the ring 46 is moved in valve opening direction (counter-clockwise, as viewed in FIG. 3), and the projection is in engagement with the second recess 96 (see FIG. 22). This pivoting of the sear moves the locking arm 74 thereof away from the ring 46 such that the slot 72 in the sear is moved relative to the sear mounting bolt 68 until the projection 92 is so removed from the second ring recess 96 as to permit the ring to be moved in valve opening direction until the projection engages the first or fully open recess 94. The release of the latching mechanism from locking engagement with the ring 46 is illustrated in FIG. 21, where the latch member 62 is shown pivoted about the mounting bolt 64 therefor by a force, hereinafter described, which is applied against the tripping shoulder 88. This pivotal movement of the latch member releases the sear flange 90 from locking engagement with the recess 84 of the latch member, whereupon a valve closing force exerted against the abutting edge 93 of the sear pivots the sear about the mounting bolt 68 until the projection 92 is removed from association or engagement with the first ring recess 94 or the second ring recess 96. If the force applied against the tripping shoulder of the latch member is released after its initial application, the latch spring 82 acts to return the latch member to a position where it will once again engage the upstanding sear flange 90 when the latter is brought into association with the recess 84. When the ring 46 has rotated sufficiently to bring the second ring recess 96 into register with the projection 92 of the sear, the sear will pivot to effect a locking engagement of the projection 92 with the second recess under the urging of the sear spring 78. The arcuate extent of the second recess enables the sear to pivot into locking engagement with the recess and to allow sufficient time for the sear flange 90 to effect locking engagement with the recess 84. The ring 46 is adjustable on the counter such that a front portion of the actuating counter can be faced in a desired direction. To this end, spaced first and second latching recesses 94a and 96a similar to the recesses 94 and 96, are formed in each of the other three quadrants respectively of the ring 46. Accordingly, it can be seen by a relocation of the ring 46 on the base 44, as by means of a temporary removal and subsequent replacement of the mounting bolts 50, the ring projection 56 and the link 58 therefor can be positioned to project from the counter in any one of four directions, so that the front of the counter can be faced as desired.

*Counting Mechanism*

The mechanism for counting the number of units of liquid passing through the meter 16 is mounted on the top surface of the base 44 and includes a register of four number wheels, comprising a units wheel 100 (see FIGS. 5 and 7) and three higher order number wheels 101, 102 and 103, mounted coaxially and rotatably on a number wheel shaft 104. The shaft 104 is carried by a pair of spaced side plates 105 and 106 rigidly upstanding from the base 44, and is held thereon by means of nuts 107 threaded onto the ends of the shaft.

Each of the number wheels has formed therein a circle of ten equally spaced peripheral notches 108 (FIG. 9) adjacent the face of the wheel, each notch having a surface portion 110 extending radially of the wheel. The notches 108 on each wheel are so positioned as to provide a means of ratcheting the wheel in a counterclockwise, advancing direction when viewed from the right side of the counter. Means are provided for identifying the angular position of each wheel on the shaft and include ten equally spaced numerals from 0 to 9 on the periphery of the wheel and adjacent the circle of notches 108. The numerals of each wheel are arranged to appear in reverse progression as the wheel is rotated in advancing direction, and are so related angularly with the notches 108 that each numeral will appear at a predetermined reading location when the notch complemental thereto is engaged by mechanism to be hereinafter described.

The units wheel further includes a pair of angularly spaced peripheral recesses 111 and 112 (see FIG. 18) adjacent the numerals, and each having a portion 113 and 116 respectively extending radially of the wheel to provide an abutment oppositely positioned to the radial surface portions 110 of the notches 108. The three higher order number wheels 101, 102 and 103, on the other hand, in addition to the peripheral notches 108 and the numerals, each include a peripheral recess 115, preferably taking the form of a narrow flat across a portion of the cylindrical wheel.

Means are provided for driving the number wheels, and include a spring clutch 110 (FIG. 7) drivingly connecting the units wheel 100 to the main shaft (not shown) of the register 24 superposed on the counter 10. The units wheel is provided with an axial recess in one face thereof in which a first hub element 114 is fixedly carried. The first hub element has an axial bore 117, and is rotatably carried thereby on a units wheel spacer 118 suitably taking the form of an elongate sleeve bushing carried by the number wheel shaft 104.

Figure 4:
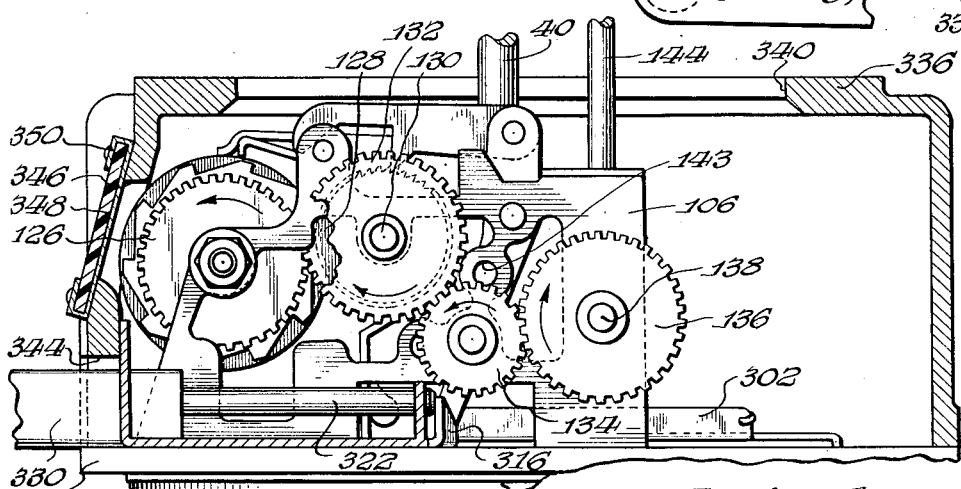
FIG. 4 is a fragmentary side elevational view of the present invention with portions thereof broken away in part.

The first hub element 114 is provided with a clutch spring receiving portion 120 and a cylindrical extension 122 of lesser diameter than the spring receiving portion and projecting concentrically from a face thereof. The cylindrical extension 122 is adapted to rotatably support a second or driving hub element 124, which suitably takes the form of a generally cylindrical sleeve rotatably mounted on the cylindrical extension 122 and fixedly carrying a spur gear 126 which in turn is drivingly connected to the main shaft of the register 24 through a suitable gear train (FIGS. 4 and 5).

The first and second hub elements 114 and 124 respectively of the spring clutch are inversely tapered complementally so as to provide a barrel-shaped spring receiving surface when the second hub element 124 is positioned on the cylindrical extension 122 of the first hub element 114. A right-hand wound helical spring 146, that is, a spring of generally cylindrical shape, formed of tightly wound wire is carried on the hub elements 114 and 124 to overlie a portion of each. Preferably the bore of the spring is accurately made to perfect the frictional contact between the spring and the hub elements although it is unnecessary to grind the elements having frictional contact, in view of the progressive manner of application of contact pressure, as hereinafter explained, which is effected by the novel clutch construction. The normal inner diameter of the spring is slightly less than the smallest diameters of the tapered hub elements, so that the spring is slidingly held on each of the latter under slight tension throughout the length of the spring, with the greatest stress concentrated in the intermediate portion of the spring. When the second or driving hub is rotated in clockwise direction, which is the direction of winding of the spring, or when the first hub element is rotated in advancing direction faster than the rotation of the second hub element in that direction, the spring will slide rotatingly relative to either or both of the hub elements. Additionally, the frictional resistance between the first hub element and the spring against this reverse action, tends to uncoil the spring, starting with the intermediate or greatest stress portion and working out toward the spring ends, to further reduce the driving force transmitted through the clutch. However, when the second hub element is rotated in counterclockwise or advancing direction, the resistance of the first hub element to rotation tends to coil the spring into a coil of lesser diameter, whereupon it tightens its engagement with the friction surfaces of both hub elements along the axial extent of the spring to effect a positive driving connection between the hub elements. Just as a reverse actuation of the spring clutch reduces the spring contact pressure on the hub elements progressively from the intermediate or strongest pressure portion out toward the spring ends to reduce the contact pressure to a theoretical zero all along the spring, so also does an advancing actuation effect strong contact pressure outward from the intermediate portion. In this action the spring does not "wrap up" on the hub elements from one end to the other in backlash developing manner during the start of advancing rotation, but rather effects an immediate positive driving connection between the hub elements.

The clutch may also be constructed with the clutch hub elements having cylindrical, non-tapering spring-receiving surfaces (not shown). For hubs of this form the helical clutch spring is of reduced diameter intermediate the ends thereof, the diameter of the spring at the ends thereof being slightly smaller than the diameter of the cylindrical hub elements so that the spring is frictionally carried by both of the hub elements along the axial extent of the spring, but with the greatest contact pressure of the spring on the hub elements occurring at the intermediate portion of the spring. A force urging relative rotation between the hub elements will tend to cause the spring to coil more tightly progressively from the intermediate portion outwardly, and will cause the spring to tightly grip both of the hub elements along its axial extent in a positive driving connection.

Another clutch construction involves the use of hub elements having complemental tubular inner friction surfaces of circular cross section, and a helical spring element carried within the former and in frictional engagement therewith along the axial extent of the spring, the spring element having strongest contact with the hub elements intermediate the spring ends. The spring for this embodiment is wound in the direction of advancing rotation of the units wheel, and upon application of a driving force thereon tending to uncoil the spring, the latter will tightly engage the friction surfaces of both hub elements along the axial extent of the spring progressively outward from the intermediate portion to effect a positive driving connection between the hub elements.

The spring clutch described above is particularly effective as a one-way clutch since it provides a strong quick-acting driving connection having a low-drag reverse overriding action on the hub elements. The axial forces in the spring are in substantial balance, permitting the spring to be slidably carried by the hub elements, not fixed to one element thereof, the doubly slidable mounting further reducing reverse drag. Even further, the clutch utilizes a simple spring which does not require expensive special treatment or processing.

The gear train driving the units wheel includes a second spur gear 128 (FIGS. 4 and 5) in operating engagement with the gear 126 and fixedly mounted on a shaft 130 journaled in the side plate 106, a third spur gear 132, fixedly carried by the shaft 130, an idler gear 134 in operating engagement with the third spur gear 132, and a fourth spur gear 136 in operating engagement with the idler gear 134. The fourth spur gear 136 is fixedly carried on a shaft 138 journaled in the side plate 106 and driven by a gear 140 which is in operating engagement with a face gear 142. The face gear 142 is fixed to a counter drive shaft 144 rotatably journaled in the base 44 and adapted to be drivingly connected to the main shaft of the register 24.

The gear train as shown in FIG. 4 causes rotation of the wheel shaft 104 at the same rate as the register main shaft. This is the situation when the spur gears 126 and 136 have the same number of teeth, and the face gear and gear 140 meshing therewith have like numbers of teeth. The spur gears 126 and 136 each has 51 teeth, in the preferred embodiment of the invention, and the preset counter may be easily changed, when desired, to cause rotation of the first number wheel of the preset counter at one tenth the speed of the register main shaft by removing the idler gear 134 and the fourth spur gear 136, substituting fixedly on the shaft 138 an eighteen-tooth spur gear, and substituting for the idler gear and in a journal 143 in the side plate 106 a sixty-tooth spur gear meshing with the eighteen-teeth gear, and a seventeen-tooth spur gear fixedly and coaxially carried relative to the sixty-tooth gear and meshing with the third spur gear 132. This simple gear substitution thus provides a convenient means of changing the units of measurement of the counter when desired.

The rotatable mounting of each of the higher order number wheels 101, 102 and 103 on the shaft 104 includes a headed bushing 145 mounted on the shaft. Each bushing 145 supports for rotation thereon a number wheel, and spaces that wheel from the next preceding number wheel to permit transfer mechanism to operate therebetween, as hereinafter explained. An end bushing 147 is provided on the shaft 104 to space the final number wheel 103 from the side plate 105. The head of each bushing 145 is provided with an annular groove 149 of substantial depth, for purposes hereinafter set forth.

Means are provided for driving the higher order number wheels and will be hereinafter referred to as transfer mechanism. A tens transfer mechanism is provided to drive each of the number wheels 101, 102 and 103 successively and independently of each other. The tens transfer mechanism (FIGS. 9-12) driving the number wheel 101 includes a units cam 148 mounted on the shaft 104 and on a face of the units wheel 100 as to be rotated by the latter (FIG. 10). The units cam 148 has an external camming surface having a uniform rise from the center of cam rotation throughout the majority of its periphery, a rise of .002 inch per angular degree and extending through 324° providing suitable results. An arcuate "dwell" portion 150 of about 20° is provided adjacent the point where the camming surface is the greatest distance from the center of cam rotation. A drop portion 152 is provided adjacent the dwell portion and is positioned to permit a cam follower, to be hereinafter described, to move radially toward the axis of the shaft 104.

The units cam 148 is provided with a bore by means of which it is mounted on the shaft 104, and is provided with a hub 156 (FIG. 7) concentric with the bore and adapted to be rotatably accommodated within a recess therefor in the first hub element 114 of the units wheel. A lug 160 projects from a face of the units cam, and is accommodated within a grove 162 (FIG. 17) in the units wheel, the groove having an arcuate extent relative to the center of the units wheel such that the units cam is rotatable relative to the units wheel about the shaft 140 through the arc of movement of the lug within the groove. Preferably the pivotable connection of the units cam on the units wheels prevents the cam 148 from advancing the units wheel ahead of the drive, as hereinafter explained.

Referring now to FIGS. 9 and 10, a cam follower 164 is provided for the units cam, and is mounted on a pawl taking the form of a reciprocable fork 166 adapted to actuate the next adjacent number wheel 101. The cam follower 164 is suitably formed as a roller sleeve 168 rotatably carried on a pin 170 fixed to a side of the fork. The cam is positioned relative to the units wheel so that the cam follower will move along the drop portion as the units wheel is rotated to bring the number "9" thereon into a predetermined reading position.

The fork 166 comprises an elongate member having a first end 172 provided with a forwardly opening longitudinal recess 174 adapted to engage the head of the bushing 145 of the number wheel 101 and to cooperate with the annular groove 149 therein as hereinafter explained. A second end 176 of the fork is slidably carried by a bracket or guide plate 178 fixedly mounted between the side plates 105 and 106. The fork is positioned perpendicularly to the shaft 104 and to the guide plate 178, and suitable slide bearing means, such as a nylon grommet 179 are mounted on the guide plate 178 to facilitate the reciprocation of the second end of the fork therethrough. The grommet preferably takes the form of a shouldered plug having a bore therethrough adapted to slidably carry the second end of the fork. Means are provided for resiliently urging the fork forwardly relative to the counter, and suitably take the form of a helical spring 180 mounted on the second end of the fork and biased between the guide plate 178 and a shoulder 182 on the fork.

The recess 174 in the fork is of sufficient length to maintain accommodation of the head of the bushing 145 therein throughout the complete reciprocating stroke of the fork, and is of height less than the diameter of the head of the bushing, but substantially greater than the diameter of the bushing shank in the annular groove 149 for purposes hereinafter explained.

The fork 166 is provided with an actuating flange 184 on the upper portion thereof and adapted to engage the radial portion 110 of each notch 108 of the number wheel 101 next adjacent thereto. A retarding flange 186 is provided on the fork, spaced longitudinally thereon from the actuating flange, and adapted to engage the non-radial portion of each notch 108 in the next adjacent number wheel 101 upon termination of the forward stroke of the fork, and to seat the wheel in an accurate angular position.

The actuation of the fork 166 by the units cam 148 is shown in FIGS. 9 through 12. As the cam 148 drivingly rotates in counterclockwise direction, as viewed from the right side of the counter, the cam follower 164 projecting from a lateral face of the fork is moved rearwardly in response to the camming action of the rise portion of the cam. Since the rise portion of the cam does not act against the cam follower in a horizontal plane, but rather acts upwardly inclined therefrom, the cam follower together with the front portion of the fork is raised pivotally as the cam follower and the fork are cammed rearwardly. This action removes the actuating flange 184 from contact with any portions of the notches 108 in the number wheel 101 to prevent any dragging or reverse rotational application of force by the actuating flange on the number wheel. The recess 174 in the fork inclines downwardly to the rear such that, at the rearmost portion of reciprocation of the fork, the forward end of the lower edge of the recess will abut the shank of the bushing 145 in the annular groove 149 to force the front end of the fork downwardly. However, additional downward movement is imparted to the front of the fork by the cam at the rearmost portion of fork reciprocation. When the cam follower moves from the dwell portion of the cam to the radial drop portion, it rounds a corner on the cam wherein the direction of the force exerted therebetween is downwardly against the cam follower, to depress the front end of the fork to an elevational position where it will engage a radial portion 110 of a notch 108 when the fork is moved forwardly by the fork spring 180. The drop portion of the cam is configured such that the cam follower will move radially toward the axis of rotation of the cam in order to minimize the force exerted by the spring urged cam follower against the cam and tending to kick the cam and the wheel on which the latter is mounted ahead. Further rotation of the cam repeats the reciprocating cycle of the fork during which the front end of the fork takes a generally oval travel path. The length of the recess 174 is sufficient to retain accommodation of the fork in the annular groove 149 throughout the complete reciprocation of the fork, which is such as to engage one notch 108 of the number wheel 101, and to rotate that wheel one-tenth of a revolution.

It can be seen that the mounting of the units cam 148 whereby the cam has a limited arcuate movement relative to the units wheel 100 allows the cam to be kicked forward by the cam follower without driving the wheel forwardly on the clutch.

Cams 194 are provided for the second and third wheels 101 and 102, respectively (FIGS. 5 and 7) each cam having a configuration similar to that of the units cam 148. The cams 194, however, are preferably formed integrally with their respective wheels, rather than being separate and movable relative thereto as is the units cam. No cam is required for the final higher order wheel 103, as will subsequently be apparent, although the final wheel may be formed with a cam for a standardization of parts for the preset counter.

The cams 194 of the second and third wheels form a portion of the tens transfer mechanism between each pair of higher order wheels, and each is adapted to cooperate with a cam follower mounted on a reciprocating fork 196, preferably identical to the units cam follower 164 and to the units fork 166 respectively, the fork 196 being supported at a forward end thereof by the corresponding headed bushing 145 on the shaft 104 and at a second end thereof by the guide plate 178. Each cam is formed on its wheel so that the cam follower therefor will move along the drop portion as the wheel is rotated to bring number "9" thereon into a reading position. As with the fork 152, each fork 196 reciprocates through a grommet 179 mounted on the guide plate 178, and is resiliently urged forwardly by a spring member 180. Each fork 196 is provided with an actuating flange 202 adapted to engage the notches 108 in the higher order number wheel next adjacent to the number wheel whose cam actuates the fork, for advancing that next number wheel. Each fork is also provided with a retarding flange corresponding to the retarding flange 186 of the units fork, and adapted to engage the notches of the next number wheel in the final portions of the advancing stroke of the fork. The cams 194 actuate the forks 196 in the manner of actuation hereinabove described of the units cam 148 on the fork 166.

The resilient urging of the forks forwardly of the counter causes the cam followers thereon to constantly bear against the complemental cams, and urges the cams toward reverse rotation, and provision is made to prevent the cams and the higher order number wheels from being so rotated in reverse direction. Accordingly, each wheel is provided with a detent member 206 (FIGS. 9 and 15) pivotally supported on a bracket 208 which in turn is fixed to the base 44. Each detent 206 has a flange 214 on the upper end thereof shaped to engage the notches 108 of its corresponding number wheel. The detent is pivotally urged toward engagement of the flange 214 with the notches of the number wheel by spring means, preferably taking the form of a hairpin spring 216 mounted between the bracket and the detent in manner to pivot the flange 214 forwardly. Each detent 206 is independent of the others and is adapted to permit advancing (counterclockwise) rotation of the wheel against the resilient resistance of the spring 216, and to engage the radial portions 110 of the notches 108 to prevent clockwise or reverse rotation as well as to accurately hold the wheel in any of its positions of rotation.

Reset Mechanism

Means are provided for individually setting the number wheels 100, 101, 102 and 103 to desired angular positions, and include for each wheel a finger key 220 (FIGS. 5, 6 and 23) reciprocably mounted on the base 44. It is to be understood that the terms "setting," "resetting" and "presetting" may all be used in describing the operation of positioning the number wheels preparatory to use of the present actuating counter. A guide means, taking the form of a reset key bracket or base 222 fixed to the base 44, is provided and includes four openings for the reset keys, each opening having the same configuration as the cross section of a key. Preferably the bracket 208 is formed integrally with the reset key base 222, and constitutes a flange upstanding therefrom.

Each key 220 carries a pawl 230 (FIG. 9) upstanding from the rearmost end and adjacent one lateral edge thereof, and in register with the notches of a corresponding number wheel. The pawl 230 is adapted to engage the notches 108 in the corresponding number wheel, and to bear against the radial portion 110 of each notch to rotate the wheel when the key is depressed rearwardly. The stroke of the key is of a length such that upon one complete depression, the pawl 230 will engage a radial portion of a single notch 108 to rotate the wheel one-tenth of a revolution.

The top 232 of the pawl 230 inclines downwardly to the front to provide a sharp abutting edge 234 on the upper rear corner thereof for engagement of the wheel notches, and to provide an inclined camming surface for effecting an overriding of the pawl past the notches 108 upon release of the key and its spring urged return to a forward position. Accordingly, the pawl 230 is carried within a bore 237 in the key 220 as to be vertically reciprocable therein, and is urged up from the key by spring means, such as a helical compression spring 236 carried within a bore 239 in the pawl 230, and acting against and between the pawl and the key. It can be seen that after a rotation of the number wheel by means of a depression of the corresponding key, the pawl 230 will be resiliently pressed downwardly by the cooperation between the camming top edge 232 and the shoulders of the notch successive to the notch engaged to rotate the wheel, to enable the pawl to ride forwardly with the key.

Referring now to FIG. 18 of the drawings, the reset mechanism for the units wheel includes a reset key 220 and a units key shaft 224 projecting longitudinally from the rearmost end thereof, the shaft having a first portion 223 slidably supported by the key and retained thereon by a snap ring 225 fixed to the shaft. A second portion 226 of the shaft 224 is slidably supported in a bore through the bracket 208. Means are provided for resiliently urging the key shaft 224 rearwardly of the units key, and include a helical spring 228 carried on the shaft 224 and biased between the rearmost portion of the key and a snap ring 227 fixed to the shaft and spaced from the rearmost end 229 thereof.

The reset keys 220 for the higher order number wheels 101, 102 and 103 are similar to the units key, but are each provided with a key shaft 240 (FIGS. 9 and 11) projecting longitudinally from the rearmost end thereof, each shaft 240 having a first portion 239 slidably carried by its key, and a second portion 241 fixedly carried by the bracket 208. Each key 220 is resiliently urged forwardly relative to the counter and to the key shaft by a helical compression spring 242 carried on the shaft 240 and bearing between the rearmost portion of the key 220 and a snap ring 243 fixed to the shaft. Preferably the snap ring 243 is spaced slightly from the end of the shaft, so that the shaft second portion 241 may be accommodated within a bore therefor in the bracket 208. A flange 245 projects laterally from the rearmost portion of the key and is adapted to engage the reset key base 222 to limit the forward travel of the key.

The units key and the two keys next successive thereto are provided with means for preventing the actuating flanges 184 and 202 of the forks 166 and 196 respectively from engagement with the notches of the next adjacent higher order number wheel so that these wheels may be manually set without changing the setting of the next adjacent wheel. Accordingly, the units key and the two keys next adjacent thereto each include an elongate cam member 250 connected thereto as to be reciprocable forwardly and rearwardly therewith, and a plunger member 251 slidably supported by the bracket 208 for reciprocation in a vertical direction (see FIGS.

14 and 15). The cam member 250 includes a lateral projection 252 at the forward end thereof, which is accommodated within a recess 253 in a lateral face of a complemental key, whereby the cam member is reciprocated longitudinally when the key is depressed or released. A longitudinal cam groove 254 is provided in the cam member, and has a portion 255 inclined upwardly to the front. The plunger member 251 carries a cam follower 256, which preferably takes the form of a projecting pin, adapted to ride in the cam groove 254 in the cam member 250 and to reciprocate the plunger in a vertical direction as the cam member is reciprocated with the key forwardly and rearwardly of the preset counter. The plunger member 251 is so positioned that during upward movement of the plunger member, an upper portion thereof will bear against the bottom of a corresponding fork 196 when the latter has been cammed toward its rearmost translational position, to pivot the fork in the grommet therefor, moving the actuating flange 202 of the fork up and out of the line of engagement with the notches of the number wheel. It will be seen that a rotation of the units wheel or either of the two wheels next successive actuates a complemental transfer mechanism fork through a complete reciprocation to move the next adjacent wheel. However, when the wheel rotation is effected by depression of the reset key therefor, the above-described fork-inactivating mechanism prevents the actuating flange of the fork from engaging the notches of the next successive wheel, so that only the wheel being set is moved by a depression of the reset key.

Means are provided for restraining the gear train driving the units wheel from rotation during the setting or presetting of the units wheel, in order that the gear train will have no backlash upon starting the meter for the next count. These means include a ratchet wheel 257 (FIGS. 16 and 17) fixedly mounted on the shaft 130 which carries the second and third spur gears 128 and 132. A lever 258 is pivotally mounted on a pivot pin 269 fixedly mounted on the side plate 106, the lever pivotally carrying at the upper end thereof a forwardly extending override pawl 259 having a lower projection 261 adapted to engage the teeth of the ratchet wheel. The override pawl includes a camming surface 263 supported ridingly on a pawl pin 265 which projects fixedly from the side plate 106. Spring means, such as a helical spring 267, is connected between the override pawl 259 and the guide plate 178 to urge the override pawl downwardly about its pivotal connection with the lever 258 and to urge the override pawl and the lever in a rearward direction pivotally about the pivotal connection of the lever to the side wall. The camming surface 263 of the override pawl is so positioned that, as the pawl is moved forwardly, the engagement between the camming surface and the pawl pin 265 permits the pawl to be pivoted down to an elevation where it will engage the teeth of the ratchet wheel.

The lower end of the lever 258 is disposed in alignment with the rearmost end 229 of the reset key shaft 224 for the units wheel and is positioned to engage the latter. When the units key is depressed, the units key shaft moves the lower end of the lever rearwardly against the resilient force of the helical spring 228 carried on that shaft. As the lever pivots about the pin 269 in response to the urging of the units key shaft, the override pawl is moved forwardly while the pawl spring pulls the override pawl downwardly on the camming surface so that the pawl projection moves into engagement with a tooth of the ratchet wheel and prevents clockwise rotation thereof as viewed in FIGURE 4. Upon further depression of the units key, the upstanding pawl 230 on the units key engages a notch 108 of the units wheel 100 to ratchet the units wheel one-tenth of a revolution counterclockwise. Rotation of the units wheel while the ratchet and the gear train are held stationary is permitted by the spring clutch hereinbefore described which permits relative reverse movement between the hub elements.

With the pawl 259 thus engaged with the ratchet wheel 257, the gear 128 is locked against clockwise rotation as reviewed in FIG. 16. Accordingly, slack in the gear train, taken up in the forward direction by previous driving of the preset counter wheels, will remain taken up. When the counter is next operated it will not then be necessary for the drive to take up any appreciable slack in the gear train and there will be minimum delay in the commencement of rotation of the number wheels. Since there is a ratchet engagement between the pawl 259 and the ratchet wheel 257, only rearward rotation of the gear 128 and the entire gear train is prevented. Accordingly, if the plunger 220 for the first number wheel 100 should, improperly, be depressed while the counter is in operation no damage will result. The counter will continue to operate, although it will permit the delivery of the newly set total. It will be apparent that depression of the other plungers 220 will likewise cause no damage to the apparatus.

*Tripping Mechanism*

The counting mechanism hereinabove described is adapted to actuate mechanism for tripping the latch mechanism to release the valve 18 for closing. The tripping mechanism includes a comb 260 (see FIGS. 5, 19, 23 and 24) having four forwardly projecting parallel finger portions 262, 264, 266 and 268 spaced apart corresponding to the positions of the number wheels. The projecting end of the first finger 262 is provided with a downwardly depending flange or hook 270 adapted to engage the recesses 111 and 112 in the periphery of the units wheel 100. The projecting ends of the fingers 264, 266 and 268 are provided with positioning flanges 274, 276 and 278 respectively, each adapted to engage the flat 115 in the wheel complemental thereto. The positioning flanges and the hook 270 are so aligned elevationally that when all of the former are in association with their corresponding flats, thereby permitting the comb to be depressed, the hook will be enabled to engage the recesses 111 and 112 in the units wheel for purposes hereinafter recited. On the other hand, when any of the higher order number wheels is in such an angular position that the flat thereon is not in register with its comb positioning flange, the positioning flange will ride on the periphery of the wheel to prevent the comb from pivoting downward sufficiently to permit the hook from engaging either of the recesses 111 or 112. Preferably the flats 115 are formed on the higher order number wheels as to be in position to engage a complemental positioning flange when the number "0" appears in a predetermined reading location for the wheels. Additionally, the recesses 111 and 112 are formed in the units wheel so as to be in position to engage the hook when the number "3" and the number "0" respectively appear in a predetermined reading location.

The mounting means for the comb 260 includes a comb bridge 282 (FIGS. 5 and 9), taking the form of a U-shaped member pivotally mounted across the base thereof on the side plates 105 and 106, as by means of a mounting shaft 283. A comb shaft 280 carried by the free ends of the arms of the comb bridge pivotally carries the comb 260. In this way, the comb is not only pivotable about the comb shaft 280, but is also pivotable about the shaft 283 pivotally connecting the comb bridge to the side members. An abutment pin 284 (FIG. 5) is provided on the side plate 105 to establish a rearmost limit of pivotal movement of the comb bridge together with the comb supported thereon. A comb spring 285 is connected to the comb 260 centrally thereof, and to the guide plate 178, and resiliently holds the comb bridge 282 at its rearmost position of pivotal movement, as well as urging the comb 260 toward contact between each flange of the comb finger portions and the periphery of the complemental number wheel.

The comb shaft 280 also carries a trigger 286 (FIG. 9) pivotally mounted at its upper end perpendicularly to the shaft and in a slot 288 provided therefor in the comb 260. The trigger comprises an elongate generally vertical member having pivotal connection with the comb shaft 280 as hereinbefore explained, and having a rearward facing tripping edge 290 adjacent its lowermost portion adapted to engage the tripping shoulder 88 (FIG. 3) of the latch member 62 upon actuation by the comb. A trigger opening 292 is provided through the base 44 to permit the trigger to pass therethrough to dispose the tripping surface 290 in proper elevational relation to the latch member 62. The trigger is resiliently urged forward pivotally about the comb shaft 280 and transversely into abutment with an edge of the sear 66, by a trigger spring 294 connected to the trigger and to the bracket 208.

As shown in FIG. 9, the trigger is provided with an adjustable fulcrum 300 on which the trigger pivots to move the tripping surface 290 against the latch member 62 when the upper end of the trigger is moved forwardly by the comb 260. The fulcrum 300 is provided by an adjustable fulcrum member 302 (FIG. 6) slidable on the upper surface of the base 44, the fulcrum 300 comprising the forward edge of a slot 304 provided in the fulcrum member to receive the register drive shaft 40 therethrough. The fulcrum member 302 further includes a downwardly depending flange 306 at its rearmost end which is tapped and threaded to accommodate a cap screw 308 which is rotatably mounted on the rearmost end of the base 44. Manipulation of the cap screw 308 in threaded engagement with the flange 306 of the fulcrum member will move the latter in a forward or rearward direction to change the location of the fulcrum 300. It can be seen that a rearward adjustment of the fulcrum positions the trigger to dispose the tripping surface closer to the point where the latch member 62 is released from locking engagement with the sear. An adjustment of the fulcrum, accordingly, affects the time of release of the latch member, and therefore the actuation of the valve, relative to the rotative position of the units wheel, so that the valve may be closed after the flow of a precise number of units of liquid therethrough.

*Emergency Stop Mechanism*

Means are provided for manually tripping the latch member 62 to free the sear 66 for pivotal movement about the sear mounting bolt 68. The manual tripping mechanism, hereinafter referred to as the emergency stop mechanism, includes an emergency stop lever 314 (FIG. 6) mounted for pivotal movement about the register drive shaft 40 and on the upper surface of the base 44. The emergency stop lever 314 has an actuating flange 316 extending parallel to the longitudinal extent of the lever and positioned at a first end 318 of the lever. A second end 320 of the lever 314 has a substantial width, and is provided with a camming edge 322 inclined from the longitudinal extent of the lever to provide a camming surface. The lever is mounted on the base intermediate the first and second ends 318 and 320 of the former respectively such that the second end will pivot about the register drive shaft when the first end is moved correspondingly. A lever spring 321 is connected between the lever 320 and the fulcrum member 302 to resiliently urge the first end 318 of the lever forwardly.

A pin 324 upstands fixedly from the second arm 76 of the latch member 62, and projects above the base 44 through an elongate slot 326. The slot 326 extends generally perpendicular to the second arm 76 of the latch member to permit the pin 324 to be moved in the slot pivotally about the latch mounting bolt 64. The pin 324 is of sufficient height to upstand from the latch member 62 through the base 44 and slightly above the level of the emergency stop lever 314, while the emergency stop lever is so configured and positioned that the camming surface 322 thereof engages the pin 324.

The means for actuating the emergency stop lever 314 include an emergency key 330 (FIG. 6) similar in appearance to the reset keys hereinbefore described, and supported in an opening through the key bracket or base 222 for longitudinal reciprocation. An extension rod 332 fixedly projects from the rearmost end of the emergency stop key 330 to bear against the actuating flange 316 of the emergency stop lever 314.

Referring now to FIG. 20, it can be seen that upon a rearward depression of the emergency stop key 330, the extension shaft 332 will bear against the emergency stop lever 314 to pivot the camming surface 322 arcuately about the register drive shaft 40 and through an arc of camming engagement with the pin 324. The camming surface 322 moves the latch member pivotally about the mounting bolt 64 therefor against the resilient force exerted by the latch spring 82, to release the recess 84 of the latch member from engagement with the locking flange 90 of the sear 66. Once the sear is thus freed, the sear can be pivotally moved about the sear mounting bolt 68 by a force acting to rotate the ring 46 in a valve closing direction. When the ring 46 rotates sufficiently to bring recess 96 into register with the locking projection 92, the sear will pivot to accommodate the projection in the recess, and to snap the flange 90 back into locking engagement with the recess 84 of the latch member. If the emergency stop key is held depressed, or is depressed a second time, the latch member will be prevented from re-engaging the flange of the sear, and the closing force exerted through the ring will pivot the sear a second time to remove the projection from the recess 96 and permit complete closure of the valve 18. When the emergency stop key 330 is released, the latch member 62 will be pivoted back to latching engagement with the sear by the force exerted by the lever spring 321 to pivot the lever and return the emergency stop key to a forward position.

*Housing*

The actuating counter is provided with a protective housing 336 (FIG. 4) which preferably has an open bottomed box-like form adapted to overlie the mechanism supported on the base 44. The housing 336 is attached to the base by suitable means such as mounting screws 338.

The housing is provided with a circular aperture 340 in its top portion through which the register drive shaft 40 and the preset counter drive shaft 144 project. The aperture 340 also serves as a means for conveniently receiving thereon the visible register counter 24, as by means of a mounting ring (not shown) in the base of the latter.

The front of the housing 336 is provided with an opening 344 through which the reset keys and the emergency stop key project. Disposed above the opening 344 and in position to expose one numeral on each number wheel is a second or reading opening 346 forming a reading location for the numbers. The reading opening is provided with a bezel crystal 348 held within a bezel rim 350 and mounted to overlie the opening. The opening 346 and the bezel crystal 348 are of sufficient length to span the four number wheels, and may be additionally extended to overlie the emergency stop key in order that an attention-catching designation, such as "stop" or "emergency stop" may be provided thereover.

*Operation*

The operation of the actuating counter is effected by initially setting the number wheels individually to angular positions whereby a predetermined number of units of liquid to be discharged through the valve 18 appears through the bezel crystal so that a predetermined count will be effected, upon completion of which the counter acts to control the valve. In other words, any predetermined count may be set up on the register of number wheels to be visible through the bezel crystal, to indicate the initial number of units of liquid to be controlled, as well as the remaining number of units at any time during the dispensing of the liquid. This is accomplished by depressing the reset key for each of the wheels which is not in desired angular position a sufficient number of times to rotate it to the desired position. As hereinbefore explained, a depression of the reset key for a wheel simultaneously inactivates the transfer mechanism between that wheel and the next successive wheel to prevent disturbance of the latter should it already be in desired position and so that only the wheel corresponding to the key depressed will be rotated. On the other hand, the detent means for each wheel provide assurances that each wheel will be set in an accurate angular position after each key manipulation.

Once the number of units to be dispensed through the valve has been set on the counter, the valve is opened by a manual application of force to the handle 28. This force in turn acts on the ring 46 and moves it in opening direction (counterclockwise when viewed from the bottom of the counter; see FIG. 22.) Movement of the ring 46 in valve opening direction pivots the sear 66 about the sear projection 90 and along the sear mounting slot 72 when the camming edge 95 of the sear projection 92 is opposed by an edge of the ring recess 96. Once the valve is in fully open position, the sear projection will seat itself in the first recess 94 and will lock the ring against movement in valve-closing direction.

When a sufficient quantity of liquid has been dispensed through the valve, and the meter 16 connected thereto has driven both the register 24 and the counter sufficiently so that the peripheral flats 115 of the higher order wheels are in alignment and positioned to accommodate therein the positioning flanges of the comb fingers, the counter will have approached a condition wherein it becomes sensitive to closing actuation. In this condition the higher order wheels will be so positioned that the zero numerals thereof are visible through the bezel crystal, and only the units wheel will indicate by an appropriate numeral the number of units of liquid to be dispensed (see FIG. 24).

When the units wheel has rotated to a point where the downwardly depending hook of the first finger of the comb engages the radial portion of the first recess 111 as the latter passes adjacent the hook after the flats 115 of the higher order number wheels have come into positioning flange receiving position, the rotating units wheel will pull the downwardly depending hook and, accordingly, the whole comb, forwardly and pivotally about the stub shafts mounting the comb bridge to the side plates (see FIG. 25). This forward movement of the comb acts to pivot the trigger, connected to the comb shaft, about the fulcrum 300 to move the tripping surface on the lower end of the trigger rearwardly into engagement with the tripping shoulder of the latch member 62, to pivot the latch member 62 and release the recess 84 thereof from locking engagement with the sear flange 90. This in turn releases the sear for pivotal movement to remove the projection 92 thereof from the first ring recess 94, whereupon the means urging the valve 18 to closed position will rotate the ring in valve closing direction. Upon pivotal movement of the sear, the second arm 76 thereof moves the trigger laterally against the resilient force of the trigger spring, to a point where the trigger is released from engagement with the latch member. Thus, even when the comb is still forward, the latch member will move back to sear engaging position.

The hook 270 depending downwardly from the comb is released from engagement with the first recess 111 upon sufficient forward rotation of the units wheel, whereupon the comb is drawn rearwardly by the comb spring to pivot the trigger back to a position adjacent the tripping shoulder of the latch member. When the latch member is in sear engaging position, it will lockingly re-engage the sear flange when the sear projection is pivoted into the second ring recess by the sear spring. The valve 18 will thereupon be held in partially open condition as long as the sear projection is held within the second ring recess.

It will be apparent that after the valve has been moved to partially closed condition, the flow of liquid therethrough will be reduced to a rate governed by the location of the second ring recess in the counter. A reduced rate of flow of liquid through the valve results in a reduced rate of metering of the liquid through the meter and a corresponding reduction in rate of rotation of the elements of the register 24 and of the units wheel of the counter.

When the units wheel 100 of the counter, now at a reduced rate of rotation, rotates further to a position immediately preceding a zero indicating position, the downwardly depending hook of the comb will be engaged by the radial portion of the second recess 112 to draw the comb forwardly a second time (see FIG. 26). This second actuation of the comb is attended by a complemental actuation of the trigger to repeat the release of the latch member from locking engagement with the sear. Again, the sear is free to be moved pivotally about its mounting bolt by force applied against the abutting edge of its projection by the ring which is urged to move in a valve closing direction by means within the valve itself, but this time the valve will be completely shut off.

The first recess 111 in the units wheel is positioned to actuate the comb a predetermined number of units before the point where the units wheel indicates that no units of liquid remain to be counted or dispensed. Preferably this recess is positioned to actuate the comb for partial valve closing when three units of measurement remain to be counted. The second peripheral recess 112 is positioned on the units wheel as to actuate the comb for complete valve closing at the point where the units wheel indicates that no units remain to be delivered through the valve.

When the rate of flow of liquid through the system is high, and the units of measurement are small, it may be desired to reduce the rate of flow at a point where more than 10 units, the counting limit of the units wheel, remain to be metered. In this event the units wheel 100 is not provided with a first recess 111, but only a recess 112 positioned as above described. In this modification, the number wheel 101, corresponding to a tens wheel, is provided with a second flat (not shown) positioned to permit reception of the comb positioning flange 274 therein when the tens wheel is in rotational position to indicate a desired number, such as 3. When the comb positioning flanges are in respective engagement with the second flat of the tens wheel 101 and with the zero indicating flats of the wheels 102 and 103, the recess 112 of the units wheel will engage the comb hook to permit a partial closing of the valve. When the comb positioning flanges are in respective engagement with the zero indicating flats of all the higher order number wheels, the recess 112 of the units wheel will engage the comb hook a second time to permit complete closure of the valve.

The actuating counter of the present invention provides a novel and effective means of controlling the dispensing of a liquid. The counter is adapted to be connected to a liquid meter and to a visible register counter driven by that meter such that the actuating counter is actuated by the meter through the mechanism of the visible register counter. This provides the advantage of coupling the dispensing controls for the system with the totals registering mechanism therefor, while at the same time being of such a construction as not to impose an undue strain on the delicate mechanisms of both the meter and the visible register counter. To this end the present actuating counter is constructed to require only a a minimal and substantially uniform driving torque. This is accomplished by the novel cooperation between the independent number wheels and the transfer mechanism therebetween, which does not impose intermittent peaks of high torque requirements on the driving mechanisms of either the meter or the visible register counter. At the same time the actuating counter is constructed to provide a positive and accurate movement of the number wheels to insure an accurately-timed control movement.

The drive mechanism for the number wheels provides a convenient means of adapting the counter to large volume and to small volume uses and is such as to permit a convenient means of changing over from a small volume counting to a large volume counting. Additionally, the counter incorporates novel yet positive latching mechanism whereby control may be maintained over a valve member in a liquids handling system, and at the same time afford an opportunity for a positioning of the counter relative to the valve in a variety of positions. This last feature is of material importance in the erection and installation of a liquids handling system.

The structure of the counter includes push-type reset keys provided as a means for individually setting each number wheel, the reset mechanism being coupled with novel mechanism for inactivating the transfer mechanism which drivingly links each wheel to its next successive wheel. The plunger type of setting control is inherently simple to operate, and may be spaced well apart. Accordingly, an operator may readily set the counter while wearing heavy gloves or mittens. The independence of setting of individual number wheels is also of great convenience. For example, if the operator wishes to set the counter to deliver 560 gallons, he may depress the plungers for the third and fourth number wheels five times simultaneously, with two fingers of one hand, and depress the third plunger one additional time. At the same time the reset mechanism includes means for preventing a backlash condition from being generated in either the units wheel or any of the higher order number wheels during the setting of the wheels. On the other hand, the cam means forming a part of the transfer mechanism between each pair of number wheels provides means for limiting or preventing any backlash condition from being built up in any of the number wheels during the operation of the counter.

As hereinbefore mentioned, the present invention is not limited to use as an element of a liquids handling system, and on the contrary, is also adapted to effective use as a means which may be used to count the movements of a machine element and to effect an initial control movement of that element or some other element, followed by a subsequent control movement thereof, at predetermined times. When used to stop a moving machine element, the invention permits an accurate stoppage of motion such as would not be possible were the moving element to be allowed to continue high speed movement right up to the point of stoppage. Furthermore the present invention lends itself to use in controlling such a mechanical system for it enables a high-speed movement period, followed by a concluding moderate-speed rotation period during which concluding operations may be added to the mechanical process being effected, with a final accurate stoppage of motion when the mechanical processing is completed.

I claim:

1. A counter comprising a register having a plurality of unitary number wheels including a units wheel and a plurality of higher order wheels, each of said wheels being rotatable through a plurality of number-indicating positions, tens transfer means connecting each wheel to a next higher order wheel, means for driving the units wheel, a plurality of devices for setting said wheels to any of their positions of rotation, and means actuated by said devices for disabling said tens transfer means whereby each of said wheels may be set independently of the other number wheels.

2. An actuating counter for a mechanism having a controlled element and a movable controlling element, said counter comprising a register having a plurality of unitary number wheels including a units wheel and a plurality of higher order wheels, each of said wheels being rotatable through a plurality of number-indicating positions, tens transfer means connecting each wheel to a next higher order wheel, means for driving the units wheel in response to the movement of the controlling element, a plurality of devices for setting said wheels to any of their positions of rotation, means actuated by said devices for disabling said tens transfer means whereby each of said wheels may be set independently of the other number wheels, and means actuated by said wheels when the latter move through predetermined angular positions to effect a control movement of the controlled element.

3. A counter comprising a register having a plurality of number wheels including a units wheel and a plurality of higher order wheels, each of said wheels having a plurality of spaced notches on the periphery thereof and being rotatable through a plurality of number-indicating positions, means for driving the units wheel, means for each pair of adjacent wheels for effecting a tens transfer from one wheel to a next higher order wheel, each tens transfer means including a reciprocating member having a portion adapted to engage the notches in a driven wheel of the pair, a resilient member urging said reciprocating member toward advancing engagement between said portion and the driven wheel, and a camming member connected to a driving wheel of each said pair and effective during substantially all of a revolution of the driving wheel for moving said reciprocating member against the resilient force acting thereagainst, and means for setting any wheel to any of its positions of rotation independently of the other number wheels, said setting means for each wheel including a depressible fingerpiece, a projecting element on said fingerpiece adapted to engage a notch of a complemental wheel when the fingerpiece is depressed, a resilient element urging said fingerpiece in one direction, and mechanism connected to said fingerpiece and engageable with said reciprocating member to displace the latter from its path of reciprocating engagement with the notches of the next higher order wheel during depression of said fingerpiece.

4. An actuating counter for a mechanism having a controlled element, said counter comprising a base, a control member movably mounted on said base, means interconnecting the controlled element and said control member, means yieldingly urging said control member in a first direction, means mounted on said base and releasably locking said control member against movement in said first direction, a register having a plurality of number wheels including a units wheel having a peripheral abutment and a plurality of higher order wheels each having a peripheral recess, each of said wheels being mounted on said base and rotatable through a plurality of number-indicating positions, means for driving the units wheel, tens transfer means connecting each wheel to a next higher order wheel, means for setting any wheel to any of its positions of rotation, and means operated by said register for releasing said control member for movement in response to said urging means when the number wheels reach predetermined positions, said releasing means including a reciprocable member having positioning portions adapted to effect peripheral engagement with said higher order number wheels respectively and a hook element projecting from said reciprocable member and adapted to engage the units wheel abutment when each positioning portion is in engagement with the recess in its complemental wheel, means resiliently urging the positioning portions and hook element of said reciprocable member into peripheral contact with the number wheels respectively and urging said reciprocable member in general opposition to the tangential direction of advancing wheel rotation, and a trigger member connected to said reciprocable member and pivotable relative to said base and against the locking means to move the latter out of locking engagement with said control member.

5. An actuating counter for a mechanism having a controlled element, said counter comprising a base, a control member movably mounted on said base, means interconnecting the controlled element and said control member, means yieldingly urging said control member in a first direction, means mounted on said base and releasably engaging said control member lockingly at a plurality of locations along the extent of the latter and against movement in said first direction, a register having a plurality of number wheels including a units wheel having a plurality of circumferentially spaced peripheral abutments and a plurality of higher order wheels each having a peripheral recess, each of said wheels being mounted on said base and rotatable through a plurality of number-indicating positions, means for driving the units wheel, tens transfer means connecting each wheel to a next higher order wheel, means for setting any wheel to any of its positions of rotation, and means operated by said register for releasing said control member for movement in response to said urging means when the number wheels reach predetermined positions, said releasing means including a reciprocable member having positioning portions adapted to effect peripheral engagement with said higher order number wheels respectively and a hook element projecting from said reciprocable member and adapted to engage the units wheel abutment when each positioning portion is in engagement with the recess in its complemental wheel, means resiliently urging the positioning portions and hook element of said reciprocable member into peripheral contact with the number wheels respectively and urging said reciprocable member in general opposition to the tangential direction of advancing wheel rotation, and a trigger member connected to said reciprocable member and pivotable relative to said base and against the locking means to move the latter out of locking engagement with said control member.

6. An actuating counter for a mechanism having a controlled element, said counter comprising a base, a control member movably mounted on said base and having a recess in an edge thereof, means interconnecting the controlled element and said control member, means yieldingly urging said control member in a first direction, means mounted on said base and releasably locking said control member against movement in said first direction, said locking means including an engaging member having a first end adapted to engage the recess of said control member, said engaging member being mounted on said base for pivotal movement about one of two pivot axes selectively, whereby the first end of said engaging member is movable into and out of engagement with the recess of said control member pivotally about one of the pivot axes as well as pivotally about the second end of the engaging member, and a resilient member urging said engaging member toward said control member, a register having a plurality of number wheels including a units wheel and a plurality of higher order wheels, each of said wheels being mounted on said base and rotatable through a plurality of number-indicating positions, means for driving the units wheel, tens transfer means connecting each wheel to a next higher order wheel, means for setting any wheel to any of its positions of rotation, and means operated by said register for releasing said engaging member from engagement with said control member for movement of the latter in the first direction in response to said urging means when the number wheels reach predetermined positions.

7. A counter comprising a register having a plurality of number wheels, including a units wheel and a plurality of higher order wheels, each of said wheels having a plurality of spaced notches around the periphery thereof and being rotatable through a plurality of number-indicating positions, means for each pair of adjacent wheels for effecting a tens transfer from one wheel to the next higher order wheel, each tens transfer means including a reciprocating member resiliently urged toward advancing engagement with a driven wheel of the pair, and a camming member connected to a driving wheel of each said pair and effective for moving said reciprocating member against the resilient force acting thereagainst, said resilient member being out of contact with said next wheel when said camming member is moving said reciprocating member against said resilient force, and means for setting any wheel to any of its positions of rotation independently of the other number wheels.

8. An actuating counter for a mechanism having a controlled element, said counter comprising a base, a control member movably mounted on said base and having a plurality of spaced recesses in an edge thereof, means interconnecting the controlled element and said control member, means yieldingly urging said control member in a first direction, means mounted on said base and releasably locking said control member against movement in said first direction, said locking means including an engaging member having first and second ends, said first end adapted to engage a first recess of said control member, said engaging member being mounted on said base for pivotal movement about one of two pivot axes selectively whereby said engaging member is movable into and out of engagement with said recesses of said control member pivotally about one of said pivot axes as well as pivotally about said second end of the engaging member, a resilient member urging said engaging member toward said control member, and a latch member pivotally mounted on said base and resiliently urged into locking engagement with said engaging member at the second end of the latter, a register having a plurality of number wheels including a units wheel and a plurality of higher order wheels, each of said wheels being mounted on said base and rotatable through a plurality of number-indicating positions, means for driving the units wheel, tens transfer means connecting each wheel to a next higher order wheel, means for setting any wheel to any of its positions of rotation, and means operated by said register for moving said latch member out of engagement with said engaging member to release the latter from locking engagement with said control member for movement thereof in said first direction to the location of a second recess in said control member in response to said urging means when the number wheels reach first predetermined positions, and means operated by said register for moving said latch member out of engagement with said engaging member to release the latter from locking engagement with said control member for further movement thereof in said first direction in response to said urging means when the number wheels reach second predetermined positions.

References Cited in the file of this patent

UNITED STATES PATENTS

| | | |
|---|---|---|
| 26,152 | Allen | Nov. 22, 1859 |
| 416,211 | Clarke | Dec. 3, 1889 |
| 729,253 | Barr et al. | May 26, 1903 |
| 1,637,606 | Dement | Aug. 2, 1927 |
| 1,966,267 | Starkey | July 10, 1934 |
| 2,097,151 | Gleason | Oct. 26, 1937 |
| 2,107,441 | Granberg | Feb. 8, 1938 |
| 2,137,013 | Bradley | Nov. 15, 1938 |
| 2,289,869 | Berck | July 14, 1942 |
| 2,395,795 | Renfrew et al. | Feb. 26, 1946 |
| 2,423,991 | Mumma | July 15, 1947 |
| 2,596,370 | Bush | May 13, 1952 |
| 2,723,013 | Rogers | Nov. 8, 1955 |
| 2,756,855 | Kloss | July 31, 1956 |